United States Patent [19]

Million

[11] Patent Number: 4,807,800
[45] Date of Patent: Feb. 28, 1989

[54] METHOD FOR MANUFACTURING THIN-WALLED HOLLOW BODIES OF CONCENTRIC METAL LAYERS

[75] Inventor: Karl Million, Oberhausen, Fed. Rep. of Germany

[73] Assignee: Man Gutehoffnungshuette, GmbH, Oberhausen, Fed. Rep. of Germany

[21] Appl. No.: 133,024

[22] Filed: Dec. 15, 1987

[30] Foreign Application Priority Data

Dec. 16, 1986 [DE] Fed. Rep. of Germany ....... 3642886
Jan. 8, 1987 [DE] Fed. Rep. of Germany ....... 3700377

[51] Int. Cl.$^4$ ............................................. B23K 9/04
[52] U.S. Cl. ................... 228/222; 228/103; 228/46; 228/226; 219/61.7; 219/76.11; 219/76.12
[58] Field of Search ............... 228/103, 226, 222, 46, 228/225; 219/76.12, 76.1, 76.11, 61.7; 29/132

[56] References Cited

U.S. PATENT DOCUMENTS

| 2,912,562 | 11/1959 | Donovan | 219/76.11 |
| 3,133,184 | 5/1964 | Rienhoff et al. | 219/76.12 |
| 3,611,541 | 10/1971 | Garrett | 228/46 |
| 3,696,228 | 10/1972 | Thomas, Jr. et al. | 219/76.11 |
| 4,101,067 | 7/1978 | Sloan et al. | 228/46 |
| 4,233,487 | 11/1980 | Moriki et al. | 219/76.11 |
| 4,256,518 | 3/1981 | Bolton et al. | 228/226 |

FOREIGN PATENT DOCUMENTS

| 49899 | 4/1982 | European Pat. Off. | 219/76.12 |
| 1120242 | 6/1959 | Fed. Rep. of Germany | 219/76.12 |
| 22539 | 2/1977 | Japan | 228/46 |
| 2076560 | 12/1981 | United Kingdom | 219/76.12 |

OTHER PUBLICATIONS

Metals Handbook, Ninth Edition, vol. 6, pp. 773-780, "Hardfacing", © 1983.

Primary Examiner—Nicholas P. Godici
Assistant Examiner—Samuel M. Heinrich
Attorney, Agent, or Firm—McGlew & Tuttle

[57] ABSTRACT

A method for manufacturing thin-walled hollow bodies comprising concentric layers forming thin-walled structural parts of chemical installations subjected to stress at high temperatures, thereby replacing non-layered pipes of single-metal materials. Due to the methods of manufacture, structural parts of these single-metal materials have disadvantages because the single materials of which they are built cannot simultaneously satisfy the demands of corrosion resistance, high-temperature stability and resistance of scaling. According to the new method, for example, thin-walled pipes of concentric, non-corrosive, high-temperature stable, and non-scaling material layers are intended to be produced. For the non-corrosive inner layer, for example, a conventional thin-walled pipe is used. On this pipe high-temperature stable as well as non-scaling layers are produced through build-up welding with one or several welding heads in a manner such that during build-up welding, the thin-walled pipe is filled with a pressurized cooling medium. In build-up welding, the inner pipe is subdivided by partition walls into one or several cooling sections 5 and provided with sectionally functioning cooling circulations adapted to the number of welding heads in the welding regions. The hollow bodies manufactured according to the method are primarily used in high-temperature installations in the chemical industry.

6 Claims, 2 Drawing Sheets

METHOD FOR MANUFACTURING THIN-WALLED HOLLOW BODIES OF CONCENTRIC METAL LAYERS

BACKGROUND OF THE INVENTION

Field of the Invention

The invention relates in general to welding and is a method for manufacturing thin-walled hollow bodies of concentric, largely non-corrosive, high-temperature stable, and non-scaling metal layers and to a device for carrying out the method.

Thin-walled hollow bodies, for example, pipes and pipe bends of concentric metal layers can in the chemical industry, especially in high-temperature installations, in which temperatures of up to 1200° occur, be required to have simultaneously several properties like corrosion resistance, high-temperature stability, and resistance of scaling.

For the specific thin-walled structural components of the previously mentioned installations non-coated pure materials are used. Due to the method of manufacture, structural parts of these materials have disadvantages, because the individual materials of which they are made, can simultaneously possess only to a limited extent several material characteristics, like corrosion resistance, high-temperature stability and resistance of scaling.

For these reasons, an aim is to find manufacturing methods, which permit constructing, for example pipes and pipe bends of different kinds of working materials structured in layers, of which each kind of working materials is intended to have primarily only one of the mentioned working material characteristic.

SUMMARY OF THE INVENTION

The invention provides a method and a device for the manufacture of thin-walled hollow bodies of concentric largely non-corrosive, high-temperature stable, and non-scaling metal layers.

Weld plating and mould welding of thick-walled hollow bodies of ferritic and austenitic materials is known.

Methods for manufacturing thin-walled hollow bodies, in which the wall of the parts is structured in layers each having separate functions are not known at this time. The method according to the invention makes available the possibility of manufacturing thin-walled structural parts of a composite which resists stresses in high-temperature installation application.

According to the method of the invention, for example a thin-walled pipe of non-corrosive, high-temperature stable and non-scaling concentric layers is produced in such a manner that onto a conventional pipe of non-corrosive material: first, through build-up welding layers of high-temperature resistance material, and subsequently onto these layers further layers of non-scaling material are applied. At the same time, pressurized inner cooling taking place for the purpose of maintaining a precisely circular pipe and for rapidly cooling the weld bead during build-up welding.

Pipes described in the preceding can, for example, be utilized in installations, in which a chemically aggressive medium flows through the pipe and in which the pipes are exposed on the outside to the effects of high temperatures i.e., these pipes are then non-corrosive on the inside and non-scaling on the outside.

If pipes are required, which, conversely, must be non-scaling on the inside and non-corrosive on the outside, such pipes can be manufactured in such a way that on a conventional inner pipe, using build-up welding, a high-temperature resistant and subsequently a non-corrosive layer is applied. The pipe subsequently is weld plated on the inside to be non-scaling with the inner pipe during build-up welding, according to the invention. It is cooled with a pressurized cooling medium. During weld plating of the pipe on the inside and on the outside, if necessary, cooling likewise can be carried out.

Accordingly, it is an object of the invention to provide a method of manufacturing, concentric, thin-walled hollow bodies, that are concentric, largely non-corrosive, high-temperature stable and non-scaling metal layers using a conventional thin-walled hollow body as a material support which comprises preparing an inner layer on the support and forming additional outer layer following the inner layer by build-up welding with one or more welding heads such that during the build-up welding, the thin-walled materials support is filled with a pressurized cooling medium.

A further object of the invention is to provide a device for thin-walled welding which includes a thin-walled hollow body a plurality of welds layers formed on said hollow body and a means for subdividing said hollow body into a plurality of cooling sections, means closing off each end of said hollow body and dividing said hollow body into a plurality of sections and means for supplying a cooling liquid into each of said section during welding.

A further object of the invention is to provide an apparatus for thin-walled welding which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

GENERAL DESCRIPTION OF THE PREFERRED EMBODIMENT

Figure 1:
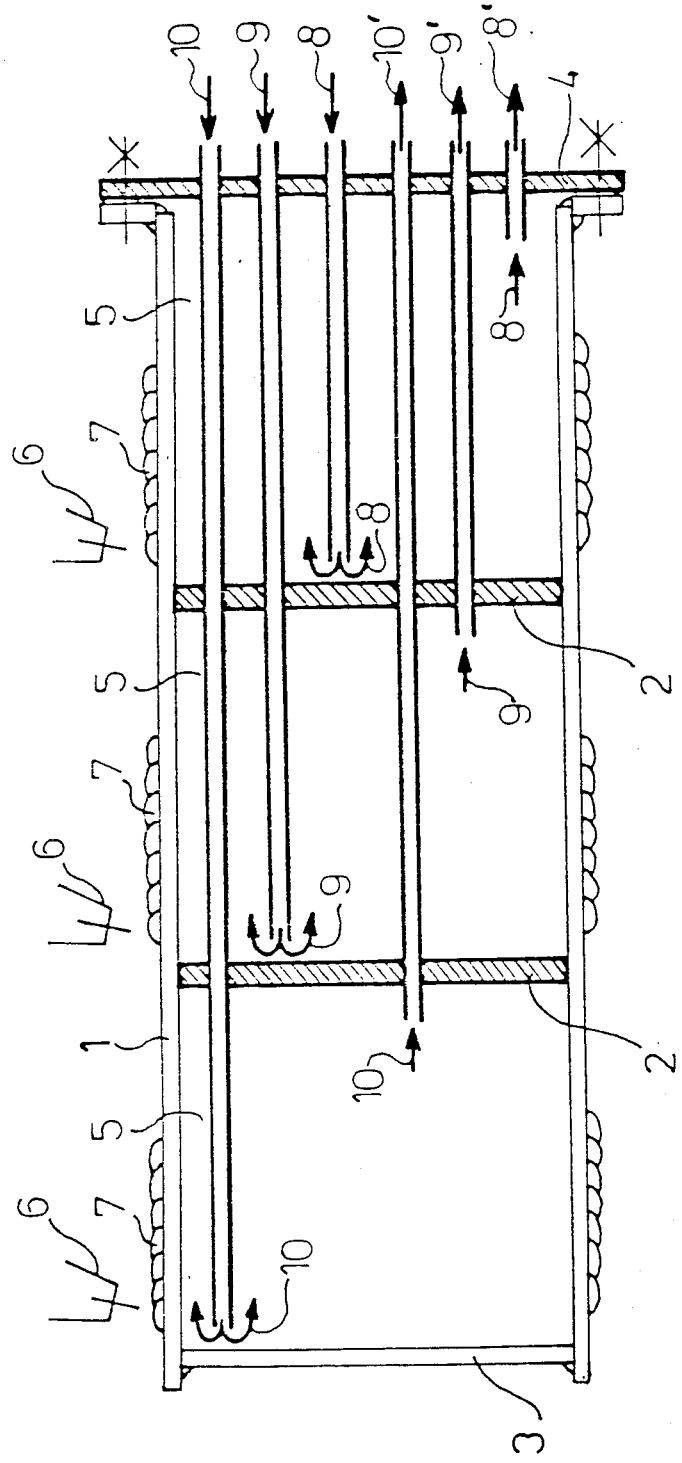
FIG. 1 is a longitudinal sectional view through a length of pipe with an internal cooling device according to the invention.

Referring to the drawings in particular the invention embodied therein comprises a method for manufacturing thin-wall hollow bodies of concentric, largely non-corrosive, high-temperature stable, and non-scaling metal layers in which a length of pipe is used as a support and various welding layers 7 are built up over the support.

According to FIG. 1, a length of pipe 1 of a thin-walled conventional pipe of a non-corrosive material is shown in the horizontal position. On the length of pipe 1 build-up welding of high-temperature layers 11 is continuously carried out by the welding heads 6.

So that during build-up welding the dimensional stability of the pipe when exposed to shrink forces of the welding beads is maintained and, on the other hand, the heat generated during the welding process by the thermal energy introduced is reliably and predictably carried off, a cooling device is introduced into the length of pipe 1.

The cooling device comprises a plurality of partition walls 2, which have circular cross-sections and are adapted to the inner diameter of the length of pipe 1. Cooling medium pipes 9 and 10 for the fluid cooling medium penetrate through each partition wall. The cooling device further has an end plate 4 through which the pipes 9 and 10 as well as the additional pipes 8 are led.

Before introducing the cooling device into the length of pipe 1, a partition wall 3 is welded to one end of the length of pipe. The cooling device set into the pipe 1 divides the pipe with the aid of the partition walls 2 into three sections 5. The end plate 4 is removably connected with the other end of the pipe 1.

The number of sections 5 of the cooling device corresponds to the number of the welding heads 6.

By way of the pipes 8, 9 and 10 fluid cooling medium, for example water, is introduced from the outside in the direction of the arrow, into the distinct sections 5 of the length of pipe 1. The heated cooling medium is brought through pipes 8', 9', 10' from the discrete sections 5 of the cooling device to the outside.

As soon as the welding process, i.e., the build-up welding of the individual layers 11 onto the conventional inner pipe 1 is completed, the cooling device is removed after the end plate 4 is taken off the length of pipe 1 and can be used again for the manufacture of additional lengths of pipe.

From the finished length of pipe 1 the partition wall 3 is cut off as well as the flange for the end plate 4 welded onto the other end of the length of pipe. Subsequently, in the same way, length of pipe after length of pipe can be manufactured and the finished lengths of pipe can then be connected in known manner by being welded together to a pipe line.

Instead of the described cooling device with fluid cooling medium an expanded metal mandrel—not shown—preferentially of copper can be used, which is inserted into the length of pipe and pressed against the inner wall of the pipe. Here, the good heat conducting properties of the copper are exploited for drawing off the welding heat. To do this, the cooling body of circular cross-section consisting of a mandrel composed for example of two or three hollow parts can be provided with a water or air cooling circulation. The hollow mandrel parts likewise, similar to the example in FIG. 1, can be subdivided into several sections.

Figure 2:
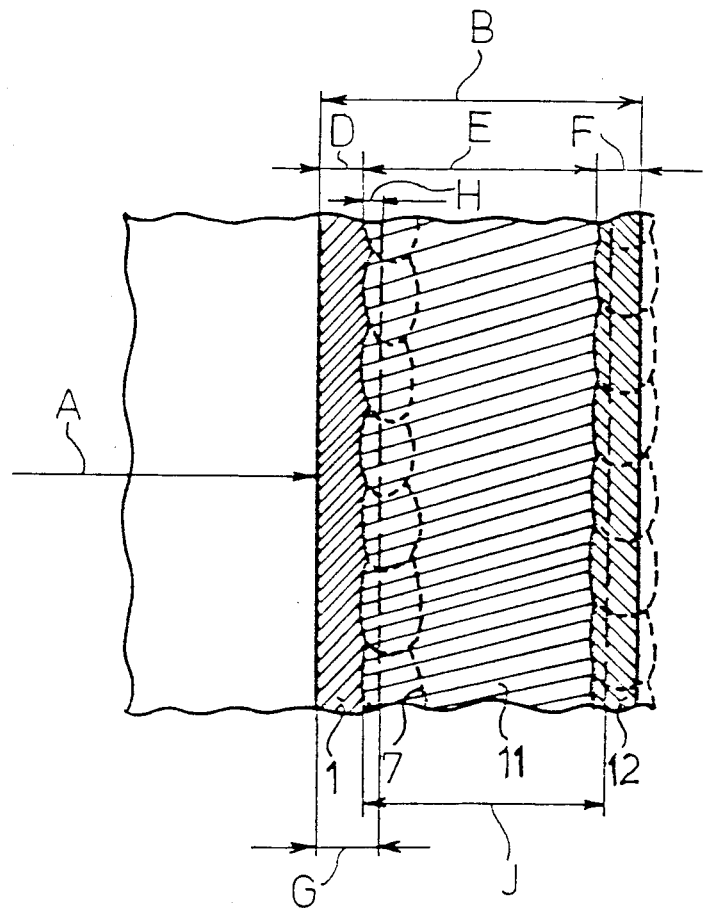
FIG. 2 is a sectional view of the build-up of the layers of the pipe wall.

Below, the manufacture of three-layered pipes, for example, is described in conjunction with FIGS. 1 and 2, with the given task of producing such pipes having an inner diameter of 100 mm (A according to FIG. 2), an overall thickness B of 8 mm, and a length per length of pipe of 2000 mm, with the non-corrosive inner layer D of the pipe 1.5 mm, the high-temperature stable middle layer E subjected to pressure 5 mm, and the non-scaling external layer F 1.5 mm.

This task is carried out by using, that for the non-corrosive internal layer D, a conventional pipe having a diameter of 104 mm, a wall thickness G of 2 mm and 2100 mm length. The 100 mm in excess of length 2000 mm are allowances at opposite ends for installing the partition wall 3 and the end plate 4 in accordance with FIG. 1.

According to the invention, water is, for example, advantageously used as cooling medium, and pressurized so that, after build-up welding, the inner pipe stays exactly circular and as a result of the effect of the welding shrink forces reaches a final inner diameter A of 100 mm.

According to the patent claims build-up welding of the 2000 mm long length pipe is carried out with several welding heads, with, in this application example, each of the four welding heads having a welding range of 500 mm length.

During build-up welding, the desired chemical composition of the layers to be applied is determined according to the mixing ratio of amounts of substance deposited and removed by the welding. The build-up welding for high mixing ratios is carried out with the support pipe in the horizontal position and, for low mixing ratios, the build-up welding is carried out with the support pipe in the vertical position.

In order to ensure that during the build-up welding of the first high-temperature stable layer 7 onto the inner pipe 1 the low penetration depth H of 0.5 mm and correspondingly low mixing is ensured, for this application example, welding is done with the pipe in the vertical position.

The four welding heads are advantageously applied stationary to the inner pipe in such a way that with each rotation of the pipe, all four welding heads are simultaneously axially adjusted by approximately $\frac{1}{2}$ welding head width and after completion of a welding section 7 by 500 mm length (radially by a layer thickness respectively) after preparation of a welding layer are brought back in the starting position.

According to another feature of the invention, a cooling device with, for example, four cooling sections 5 are used, within this relatively short length of pipe of 200 mm according to claim 5, the alternative of communicating cooling circulations being applied and an approximately constant pressure being exerted in all cooling sections of the perpendicular length of pipe. The quantity of cooling medium flowing through per unit of time is a function of the required cooling effect.

Subsequently, on the first layer 7 of the high-temperature stable material layer, in the same manner an overall thickness of at least 5.5 mm is build-up welded in several layers 11 and, if necessary, mechanically finished to a final dimension J of 5.5 mm.

Lastly, for example, using the same approach, however with the material suitable for non-scaling properties, an external layer 12 of at least 1.5 mm is build-up welded respectively reworked to final dimensions F. Subsequently, the allowances of 50 mm at both pipe ends are removed.

What is claimed is:

1. A method for manufacturing thin-walled pipes of concentric, largely non-corrosive, high-temperature stable, and non-scaling metal layers, using a thin-walled material support pipe and at least one welding head, comprising preparing an inner layer on the support pipe, forming a plurality of additional outer layers following the inner layer by build-up welding with the said at least one welding head such that, during the build-up welding, the thin-walled material support pipe is filled with a pressurized cooling medium.

2. A method according to claim 1 wherein, during build-up welding, the desired chemical composition of the layers to be applied is determined according to the mixing ratio of amounts of substance deposited and removed by the welding, the build-up welding for high mixing ratios being carried out with the support pipe in a horizontal position and, for low mixing ratios, the build-up welding being carried out with the support pipe in a vertical position.

3. A method according to claim 1 wherein the build-up welding is carried out with a plurality of welding heads and the support pipe and the welding heads are rotated relatively during welding, all welding heads being simultaneously operated by the relative rotation so that the welding advances radially and axially with respect to the support pipe and that, irrespective of whether the support pipe or the welding heads actually rotate, the weld build-up in the radial and axial direction always takes place fully automatically.

4. A method for manufacturing thin-walled pipes of concentric, largely non-corrosive, high-temperature stable, and non-scaling metal layers, using a thin-walled material support pipe and a plurality of welding heads at respective axially spaced welding zones along the pipe comprising the steps of:

preparing an inner layer on the support pipe;

forming a plurality of additional outer layers following the inner layer by build-up welding by operating the welding heads simultaneously;

dividing the pipe interior into axially spaced cooling zones associated with respective welding zones; and, supplying separate streams of coolant under pressure to respective zones;

such that, during the build-up welding, the support pipe is filled with pressurized cooling medium distributed to provide even shrinkage of the pipe in each zone during welding.

5. A method according to claim 4 wherein, during build-up welding, the desired chemcial composition of the layers to be applied is determined according to the mixing ratio of amounts of substance deposited and removed by the welding, the build-up welding for high mixing ratios being carried out with the support pipe in a horizontal position and, the build-up welding for low mixing ratios being carried out with the support pipe in a vertical position.

6. A method according to claim 4 wherein the welding heads are all simultaneously set and driven by the relative motion of the support pipe to be manufactured with the welding advancing radially and axially with respect to the support pipe so that, irrespective of whether the support pipe or the welding heads actually rotate, the weld build-up in the radial and axial direction always takes place fully automatically.

* * * * *